STEP-BY-STEP FEED DEVICE AND BRAKE MEANS FOR RECORD MEDIA

Filed Oct. 19, 1964 3 Sheets-Sheet 1

INVENTOR
MANFRED FLEISCHER

BY Percy P. Lantzy
ATTORNEY

INVENTOR

MANFRED FLEISCHER

BY Percy P. Lantzy

ATTORNEY

INVENTOR
MANFRED FLEISCHER

BY Percy P. Lantzy
ATTORNEY 3,279,668

STEP-BY-STEP FEED DEVICE AND BRAKE MEANS FOR RECORD MEDIA

Manfred Fleischer, Pforzheim, Germany, assignor to International Standard Electric Corporation, New York, N.Y., a corporation of Delaware Filed Oct. 19, 1964, Ser. No. 404,654
Claims priority, application Germany, Oct. 26, 1963, St 21,233
2 Claims. (Cl. 226—145)

The present invention relates to a device for the feeding of record media which are advanced in a step-by-step manner with the aid of feed rollers and retarding (brake) magnets. Various types of devices of this kind have already become known in which the record medium each time runs between a press-on roller and a feed roller serving as the driving device, and the armature and the yoke of a magnet serving as the retarding or brake device. These arrangements, however, have the disadvantage that during the passage of a tape joint, the feed rhythm is partly disturbed in a noticeable way, which may be the cause of faulty readouts. These disturbances are particularly noticeable in such types of arrangements in which the tape travels at a relatively high speed of 200 to 1000 c./s. characters per second in a start-stop operation, in other words, where the tape comes to a standstill after each feed operation, hence 200 to 1000 times per second.

The difficulties caused by a tape joint cannot be eliminated with the aid of the hitherto conventional types of driving arrangements (FIG. 1) and retarding or braking arrangements (FIG. 2). The tape 1 which is to be fed, is pressed with its tape joint 2 by the press-on rollers 3 and 4 against the permanently rotating feed roller. The press-on rollers are arranged on a common roller support 6 which is movably seated on the shaft 7. This shaft 7 is movably arranged vertically in relation to the direction of tape feed, in a manner not particularly shown in the drawings.

As soon as a tape joint 2 enters the driving system according to FIG. 1, the press-on roller 3 and, consequently, also the shaft 7 is lifted upwards. For a short period of time there are thus established uncontrollable conditions which are the cause of an unsteady tape passage which is likely to cause faulty readouts at the reading station or, in the case of a synchronous feed of the tape 1, may cause the latter to fall out of step. In a similar way also the armature of a brake or retarding device 9 (FIG. 2) will be caused to jump upon entering of the tape joint 2, provided that this retarding device only comprises one armature 8.

Moreover, there is already known the driving arrangement for tape-shaped record media in which the recording medium is pressed against a feed roller by two press-on rollers arranged on crossing limbs in a scissors- or shear-shaped manner by the action of spring forces. In such an arrangement there are provided two press-on rollers which are mechanically independent of one another. These, however, are unsuitable for the use in a very rapid start-stop driving operation, because the press-on force of the rollers is only produced by mechanical spring force which is only capable of being controlled relatively slowly.

The present invention is aimed at avoiding the disadvantage caused by the tape joint. According to the invention this is accomplished in that by the alternating attraction of at least two magnetically controlled press-on rollers which are mechanically independent of one another, on one hand, and of at least two magnetically controlled retarding or braking devices which are mechanically independent of one another, on the other hand, the record medium lying between them is fed in a step-by-step manner.

The invention will now be described in detail with reference to FIGS. 3 to 5 of the accompanying drawings, in which.

Figure 1:
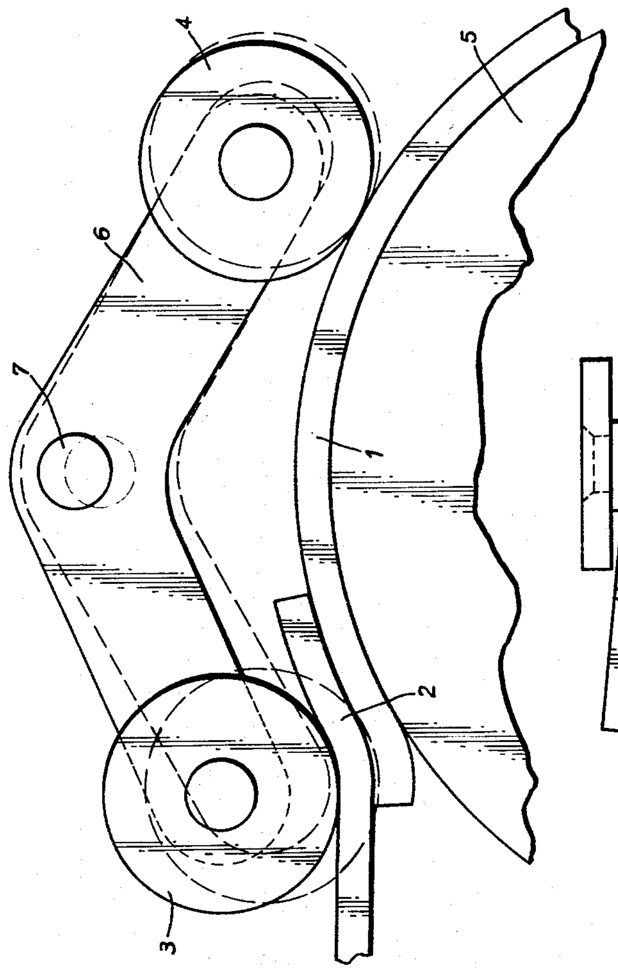
FIG. 1 shows a conventional type of driving arrangement.
Figure 2:
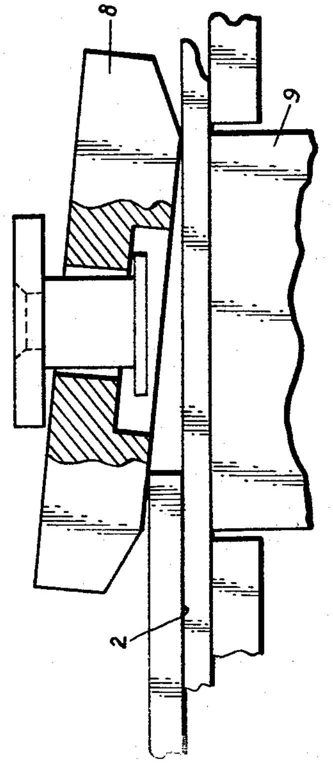
FIG. 2 shows a conventional type of braking arrangement.
Figure 3:
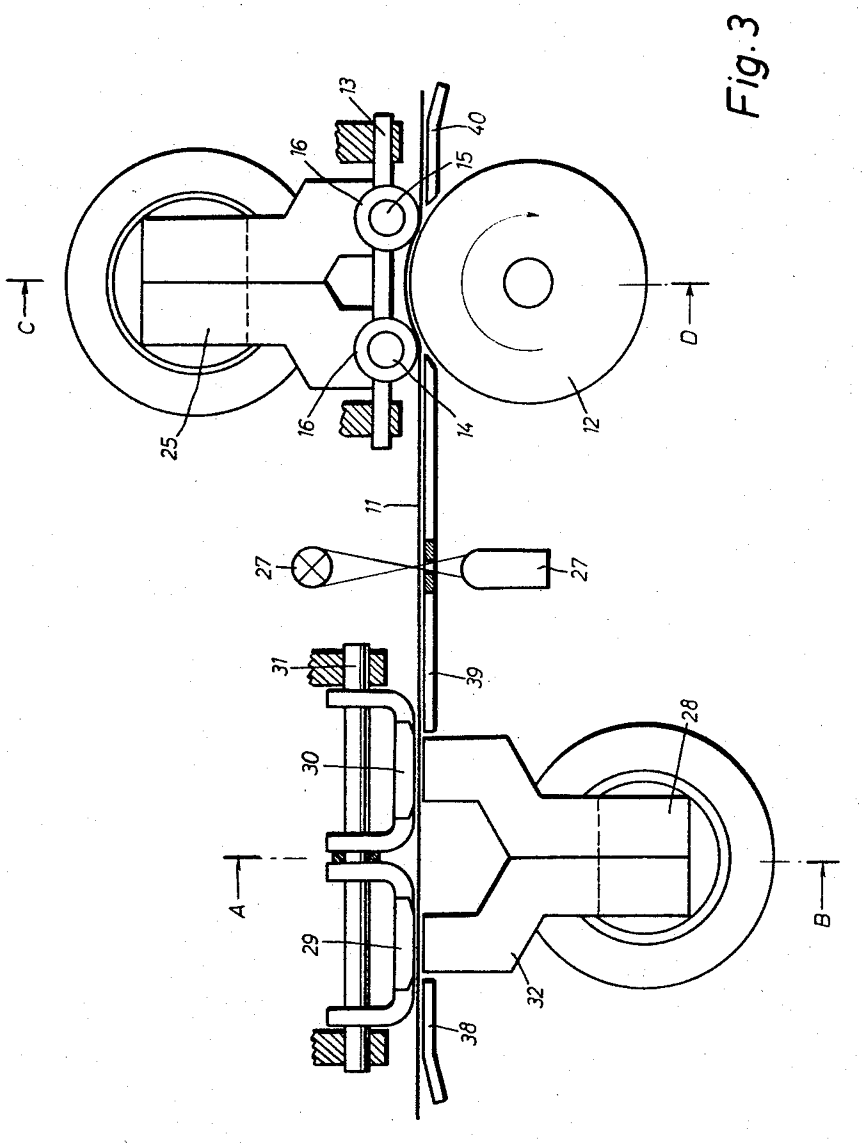
FIG. 3 shows a total arrangement of the driving system comprising the retarding or braking device and the readout station.
Figure 4:
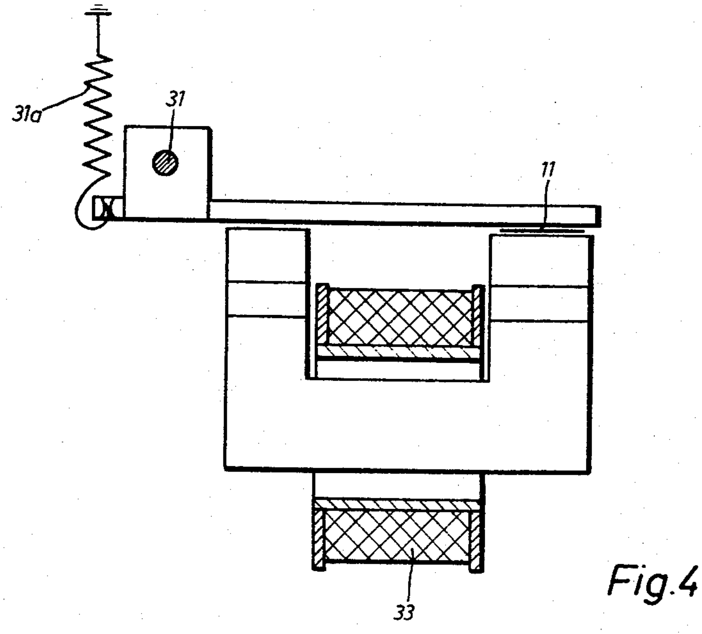
FIG. 4 shows the partly sectional view of the retarding or braking device.
Figure 5:
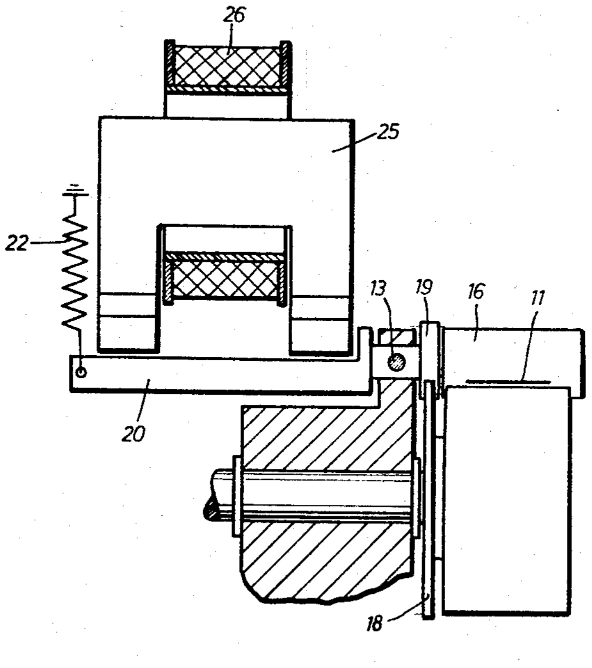
FIG. 5 shows the partly sectional view of the driving system.

The tape shaped record medium 11 is fed or advanced over the guide tracks 38 to 40 with the instrumentation of a feed roller 12 which is continuously driven in the direction indicated by the arrow, by a not shown source of power. By the driving rollers 16 which are driven via the toothed-wheels 18 and 19, the tape 11 is pressed against the rotating feed roller 12, and is thus fed or advanced. The press-on rollers 16 are slewably arranged at a common centre of rotation 13. The shafts 14 and 15 respectively serving as supporting bolts for the two press-on rollers 16, are partly designed as armatures 20 and 21 according to FIG. 5, and are slightly pressed against the feed roller 12 with the aid of two weak springs 22. Above the two armatures 20, of which only one is visible in the drawing, there is arranged a magnet 25 which, at a passage of current through the coil 26, serves to attract the two armatures 20 for consequently pressing the rollers 16 against the feed roller 12 or the tape 11 respectively. In the middle of the guide track 29 there is arranged the readout station 27 which is not described in detail herein, because of being unimportant in connection with the description of the invention. Between the guide tracks 38 and 39 there is arranged the retarding or braking magnet 28 (FIG. 3). This magnet is fitted with two armatures 29 and 30 which are movable independently of one another vertically in relation to the feed plane, with these movable armatures 29 and 30 being rotatably supported on the shaft 31, and being slightly pressed against the double yoke 32 of the retarding or braking magnet 28 by the action of weak springs 31*a*.

In the event of a current flowing through the coil 33, the tape 11 is pressed between the armatures 29 and 30, on one hand, and the double yoke 32 on the other hand, and is thus retarded. In cases where the magnets 25 and 28 are alternately acted upon by current, the tape 11 is led past the readout device 27 in start-stop steps.

As soon as a tape joint enters the retarding or braking magnet, the armature 29 is lifted upwards suddenly, whereas the armature 30 will remain to lie completely quiet on the tape 11, thus performing its function in an undisturbed way.

If the tape joint runs below the armature 30, the latter is suddenly lifted upwards, whereas the armature 29 will again be lying quietly on the tape 11, thus taking care of a uniform passage of the tape. In a similar way also the press-on rollers 16 behave during the passage of a tape.

What is claimed is:

1. A feed device for record media, consisting of a feed roller and of press-on rollers which, by a controllable, magnetomotive force, without a delay, presses the recording medium between the feed roller and the press-on rollers, and including a retarding or braking device between whose armature and yoke, the recording medium is caused to pass, by a low-delay and controllable, magnetomotive force, characterized in this, that by the alternating attraction at least two magnetically controlled press-on rollers which are mechanically independent of one another, and of at least two magnetically controlled retarding or braking devices which are likewise mechanically independent of one another, the record medium lying between them, is fed in a step-by-step manner.

2. A feed device according to claim 1, characterized in this, that when using magnetic forces, the yoke of the driving and of the retarding magnet is designed in such a way that the magnetic flux is split up into two or more paths.

References Cited by the Examiner

UNITED STATES PATENTS

| | | | |
|---|---|---|---|
| 3,100,591 | 8/1963 | Trimble | 226—176 X |

FOREIGN PATENTS

| | | |
|---|---|---|
| 895,325 | 1/1945 | France. |
| 917,309 | 1/1963 | Great Britain. |

M. HENSON WOOD, Jr., *Primary Examiner.*

A. N. KNOWLES, *Assistant Examiner.*